United States Patent [19]

Dupin et al.

[11] Patent Number: 4,602,000

[45] Date of Patent: Jul. 22, 1986

[54] PROCESS FOR MANUFACTURING A CATALYST ON AN ALUMINA SUPPORT AND THE CATALYST PRODUCED BY THE PROCESS

[75] Inventors: Thierry Dupin, Garches les Gonesses; Jacques Caillod, Taverny; Patrick Leroux, Nanterre; Germain Martino, Poissy, all of France

[73] Assignee: Societe Francaise des Produits pour Catalyse Pro-Catalyse, Rueil-Malmaison, France

[21] Appl. No.: 679,434

[22] Filed: Dec. 7, 1984

[30] Foreign Application Priority Data

Dec. 9, 1983 [FR] France ................................. 83 19718

[51] Int. Cl.$^4$ .......................... B01J 21/04; B01J 23/74; B01J 23/85
[52] U.S. Cl. .................................... 502/335; 502/314; 502/332; 502/333; 502/334; 502/336
[58] Field of Search ............... 502/332, 333, 334, 335, 502/336, 314

[56] References Cited

U.S. PATENT DOCUMENTS

| | | | |
|---|---|---|---|
| 3,549,556 | 12/1970 | Dienes | 502/335 X |
| 3,554,929 | 1/1971 | Aarons | 502/332 X |
| 3,669,904 | 6/1972 | Cornelius et al. | 502/334 |
| 3,787,333 | 1/1974 | Ichihara et al. | 502/314 |
| 3,928,238 | 12/1975 | Koberstein et al. | 502/332 X |

Primary Examiner—W. J. Shine
Attorney, Agent, or Firm—Millen & White

[57] ABSTRACT

The invention concerns a process for manufacturing a catalyst containing a carrier formed in major part of alumina and an active phase, the alumina carrier being obtained by admixing an alumina binding agent with a charge of alumina base.

The process is characterized in that at least a portion of the active phase or of its precursor is introduced during the manufacture of the carrier so as to be present in the binding agent or in the charge before or during the admixture of the charge with the binding agent.

The resultant catalyst may be used in reactions of hydrocarbons and carbon monoxide hydrogenation.

13 Claims, No Drawings

PROCESS FOR MANUFACTURING A CATALYST ON AN ALUMINA SUPPORT AND THE CATALYST PRODUCED BY THE PROCESS

The present invention concerns a process for manufacturing a catalyst of alumina base, containing an active phase, generally comprising at least one metal from group VIII of the periodic classification and at least one additional metal used as promoter.

BACKGROUND OF THE INVENTION

Generally, in the prior art, the catalyst is prepared in two steps:
(a) the carrier is prepared or bought on the market,
(b) an activating phase is then deposited on the carrier.
It contains generally (α) at least one metal mostly from group VIII of the periodic classification of elements, generally present in the catalyst as metal or for example as oxide or sulfide and (β) optionally at least one socalled additional metal (or promoter) from any group of the periodic classification of elements, generally present in the catalyst as oxide or sulfide for example.

According to the prior art, several methods may be used to incorporate the active phase of the catalyst into the carrier:

Generally, each metal individually or all the metals together may be incorporated to the carrier by means of a suitable method, consisting of a co-precipitation or cogelation with the porous carrier or an ionic exchange with the gelated carrier or further an impregnation of the carrier, either before or after the drying and roasting of the latter.

SUMMARY OF THE INVENTION

Generally, the invention concerns a process for manufacturing a catalyst comprising an active phase consisting of at least one metal of the platinum family and at least one additional metal and a carrier obtained by admixture of a binding agent with a charge, the process comprising the following steps:
(1) admixture of a charge, a binding agent and at least a portion of the active phase,
(2) shaping of the mixture,
(3) drying and optionally roasting,
(4) optional introduction of the remaining portion of active phase, followed with a drying and then an activation.

In said process the major part of the metals of the platinum family and/or the major part of the additional metals are introduced either in the binding agent or in the charge during the first step.

According to the present invention, the catalyst carrier is prepared from an aqueous alumina composition. Said carrier comprises a binding agent essentially constituting the dispersed part and a charge essentially constituting the non dispersed part of the composition. Preferably, the dispersion rate of the water of the composition, resulting from the admixture of the binding agent with the charge, ranges from about 10 to 60% and, for certain applications of the catalysts, the granulometry of the non dispersed part of the composition may be further so selected that the average diameter of the alumina particles of which it is formed ranges from 1 to 15 microns, at least 70% of said particles having an average diameter comprised between half the average diameter and twice said average diameter.

The dispersion rate is represented by the proportion of alumina remaining in total colloidal suspension after the composition has been subjected to centrifugation. This dispersion rate may be measured as follows: the alumina aqueous composition is diluted so as to obtain a total alumina concentration of 100 g/l; 100 cc or said solution are subjected to vigorous stirring for 10 minutes; the solution is then centrifuged for 10 minutes at a running speed of 3000 runs per minute; the settled part is separated from the unsettled part formed of alumina colloidal suspension. After roasting, the settled part is weighed; the dispersion rate is expressed as the ratio between the initial total alumina amount of the composition less the settled alumina amount, in proportion to the total initial alumina amount of the composition.

According to the present invention, the dispersion rate in water of the aqueous alumina composition is preferably 10–100%, more particularly 15–40%, the granulometry of the non dispersed part of the composition is such that the average diameter of the alumina particles of which it is formed ranges preferably from 1 to 15 microns.

The non dispersed part of the composition consists essentially of the charge; a minor fraction thereof may come from the binding agent.

The binding agent proportion of the composition weight (total weight of the carrier) is preferably 10–60% and more particularly 15–40%. Accordingly, the proportion by weight of the charge in the composition is 40–90%; more particularly 60–85%.

According to the invention, the alumina binding agent consists essentially of a portion of dispersed alumina and optionally a minor portion of non dispersed alumina, the dispersed portion amounting preferably to at least 70% by weight of the binding agent. Hereinafter, the term binding agent will be used to designate the dispersed portion (even if all the binding agent is not dispersed) and the term charge will designate the non dispersed portion (even if a portion of the charge, smaller than 10% by weight, is in dispersed state).

The invention concerns a process for catalytic reforming or aromatic hydrocarbons production, in the presence of a catalyst containing (a) a carrier, the major part of which is formed of alumina and (b) an active phase, the alumina carrier used for the manufacture of the catalyst being obtained by admixture, shaping, drying and roasting of an alumina binding agent and an alumina charge. The manufacture of the catalyst is remarkable in that at least a portion of the active phase has been introduced during the manufacture of the carrier, so that said active phase is to be found in major part in the binding agent or in major part in the charge or both in the charge and in the binding agent before or during the admixture of the charge with the binding agent. The method consists, for example, of introducing at least a portion of the active phase, mostly in the binding agent or mostly in the charge during the admixture of the charge with the binding agent.

According to an alternative embodiment of the process, the alumina charge (in view of improving its thermal stability) may be at least partially replaced with an oxide selected from the group consisting of magnesium, calcium, strontium, barium, scandium, yttrium, lanthanides, gallium, indium, thallium, boron, silicium, titanium, zirconium, hafnium, thorium, germanium tin, lead, vanadium, niobium, tantalum, chromium, molybdenum, tungsten, rhenium, iron, cobalt, nickel, copper, zinc and bismuth oxides.

The catalysts prepared according to the invention may be used in reactions for the conversion of hydrocarbons, particularly the hydroconversions of hydrocarbons such as, in particular, the catalytic reforming processes as well as the catalytic processes for producing aromatic hydrocarbons. These processes are performed, for example, at a temperature of 430°–600° C. under an absolute pressure of 0.1–5 MPa with a hourly rate of 0.1–10 volumes of liquid charge per volume of catalyst, the molar ratio hydrogen/hydrocarbons being from 1 to 20.

These catalysts are also convenient for the hydrocracking reactions, generally conducted at a temperature of about 260°–530° C., under a pressure of about 0.8–25 MPa. The conversion conditions comprise a hourly liquid space velocity or HLSV (volume per hour of liquid charge at 15° C. per catalyst volume), of about 0.1–10.0, with preferably an upper limit of about 4.0 and a hydrogen feed rate of about 1–20 moles/mole of charge.

The so-prepared catalysts are also convenient to catalyze reactions of aromatic hydrocarbons (e.g., xylenes) such as isomerization, which reactions are usually conducted at a temperature of about 200°–600° C., under a pressure of about 0.005–7 MPa, the hourly volume flow rate from 0.1–10 times the catalyst volume.

The so-prepared catalysts are also convenient for isomerizations, in hydrogen atmosphere, of saturated hydrocarbons comprising 4–7 carbon atoms, at a temperature of 50°–250° C., for example 100°–200° C. The operation is preferably conducted under a pressure of 0.5–10 MPa, at a space velocity of 0.2–10 liters of charge per liter of catalyst and per hour. The molar ratio $H_2$/hydrocarbon is, for example, from 0.01:1 to 10:1.

These catalysts are also convenient for reactions of aromatic hydrocarbons hydrodealkylation or steam-dealkylation, these reactions being performed in known operating conditions, generally a temperature of 300°–600° C., so as to produce benzene from toluene or from other alkylbenzenes.

The so-prepared catalysts are also convenient for the so-called post-combustion reactions, i.e. for the treatment of exhaust gases from internal combustion engines.

These catalysts are also convenient for various hydrotreatments of petroleum products, for example hydrodesulfurization, hydrodemetallation, hydrodenitrification.

They may also be used in reactions for recovering sulfur from sulfur-containing compounds (particularly Claus catalysis) and also in reactions of methanation or of hydrocarbons hydrogenation.

The catalysts used in the above-listed reactions contain a carrier, generally alumina, into which has been introduced a so-called active phase based on at least one metal of the periodic classification of elements and commonly during the last 20 years, two metals or more. Thus, specific catalysts suitable for the above-mentioned processes are catalysts containing an alumina carrier and critical amounts of various adequate metal elements (metals or metal compounds). Thus, for example, specific catalysts are those which generally contain the following additive proportions by weight with respect to the alumina carrier:

(a) 0.05–2% of at least one precious metal selected from platinum, palladium, iridium, ruthenium, rhodium and osmium (preferably platinum, iridium, ruthenium and rhodium) or 0.1–30% of at least one metal selected from iron, cobalt and nickel.

(b) Optionally 0.01–25% of at least one second metal selected for example, from titanium, rhenium, tin, germanium, indium, thallium, manganese or still copper, silver, gold, niobium, lanthanum, cerium, samarium and other metals of the rare-earth family, zirconium, thorium, hafnium, lead, gallium, vanadium, uranium, chromium, molybdenum, tungsten, zinc, cadmium, bismuth, antimony, etc. and (c) still optionally, for certain reactions, 0.1–10% of halogen for example, chlorine or fluorine.

Such catalysts, largely used in the prior art, have been progressively improved with respect to one another by using a specific metal promoter at a particular critical concentration and have resulted in often remarkable results in the above-listed reactions, as far as the yields and the reaction selectively in particular as well as the stability, and hence the life-time of the catalyst, are concerned.

It has now been observed that with the same catalyst (i.e. a catalyst containing an alumina carrier and identical contents of active metals) the yield and the selectivity of the reaction for which it is used, as well as the stability and the life-time of the catalyst, may be increased. These improvements result from a particular method of catalyst manufacture. Thus, for example in the reforming reactions, a yield improvement of only 0.1% by weight, would result in substantial gain of gasoline, which may be determined as follows:

An industrial unit of average size operating with a VVH of 1.65 (naphtha volume/catalyst volume/hour) requires about 50 tons of catalyst. This means that the unit is operated with:

$40 \times 1.65 = 66$ tons of charge per hour, i.e.

$66 \times 24 = 1,584$ tons of charge per day, i.e.

$1,584 \times 365 = 578,160$ tons of charge per year.

A yield by weight of 75% would result in an annual production of:

$578,160 \times (75/100) = 433,620$ tons of gasoline.

A mere increase of only 0.1% of the yield would result in an annual production of:

$578,160 \times (75.1/100) = 434,198.16$ tons of gasoline.

This increase, although of relatively small amount, of the yield, would hence result in an annual gain of $434,198.16 - 433,620 = 578.16$ tons of gasoline. This is far from being negligible thus showing the interest of any new method of catalyst manufacture.

The particular method of catalyst manufcature also provides catalysts which can be used in severe operating conditions. Thus, more particularly, the use of catalysts prepared in conformity with the present invention is particularly adapted:

to the reforming reactions, in view to obtain a gasoline of clear octane number of at least 102. The severe conditions of catalytic hydroreforming reactions are more particularly the following: average temperature of about 510°–580° C., pressure of about 0.5–1.8 MPa (5–18 kg/cm2) preferably 0.6–1.3 MPa, hourly velocity of 1–10 volumes of liquid charge per volume of catalyst and recycle rate of 6–10 moles of hydrogen per mole of charge. The charge is generally a naphtha distilling between about 60° C. and about 220° C., particularly a straight-run naphtha.

To the reactions of aromatic hydrocarbons production from unsaturated or saturated gasolines (for producing benzene, toluene and xylenes). When the charge is unsaturated, i.e. contains diolefins and mono-olefins, it must be first made free thereof, by selective or total hdyrogenation. Then the charge, optionally made free, by hydrogenation, of substantially all its diolefins and mono-olefins, if any, is treated with hydrogen, at a temperature of about 530°–600° C. under a pressure of 0.1–1.3 MPa (1–13 kg/cm2), the liquid charge hourly flow rate by volume being about 1–10 times the catalyst volume, the molar ratio hydrogen/hydrocarbons being of about 6–20.

The charge may consist of gasolines produced by pyrolysis, cracking, in particular steam-cracking or catalytic reforming, or of naphthenic hydrocarbons capable of being converted to aromatic hydrocarbons by dehydrogenation.

In the process according to the invention, the binding agent in in powder form.

The aluminum binding agent must be gelatable or coagulable by thermal or chemical effect.

The gelation or coagulation by thermal effect is well known in the art and may be obtained by evaporation of water from the aqueous suspension or dispersion of alumina forming the binding agent. The gelation or coagulation by chemical effect is also well known in the art and may be obtained by increasing the pH of the aqueous suspension or dispersion of the alumina forming the binding agent, up to a value higher than 9, which corresponds to the isoelectric point of alumina.

Alumina binding agents used according to the invention are particularly the aqueous suspensions or dispersions of fine or ultra-fine boehmites which are formed of particles of a size within the colloidal range, i.e. lower than about 2000 Å.

The aqueous dispersions or suspensions of fine or ultra-fine boehmites may be obtained, as well known in the art, by peptization of these products in water or acidulated water. The fine or ultra-fine boehmites used according to the invention may particularly be obtained by the process disclosed in the French Pat. Nos. 1 262 182 and 1 381 282 or in the European patent application No. 15 196.

The French Pat No. 1 262 282 discloses particularly a process for manufacturing fine or ultra-fine boehmite by heating an aqueous alumina dispersion in the presence of a monovalent acid radical, the alumina aqueous dispersion being obtained from aluminum basic chloride, aluminum basic nitrate, aluminum hydroxide, alumina gel or colloidal solutions. This product, sold on the market by Du Pont de Nemours, under trade mark Baymal, is a fine or ultra-fine fibrillar boehmite of 250–350 m2/g specific surface.

The French Pat. No. 1 381 282 discloses in particular a process for manufacturing fine or ultra-fine boehmite consisting of subjecting to a temperature within 60°–150° C. a suspension or cake of amorphous hydrated alumina gel, containing up to 35% by weight of alumina as $Al_2O_3$, and, per $Al_2O_3$ mole of said alumina, from 0.05 to 0.5 monovalent acid ions, during 15 hours to 10 days. The cake was obtained by drying, washing and filtering the alumina gel, continuously precipitated at a pH from 8 to 9, from a solution of sodium hydroxide aluminate and nitric acid. The specific surface of these products generally varies from 200 to 600 m2/g.

The European patent application No. 15 196 discloses in particular a process for manufacturing boehmite, at least partially as ultra-fine boehmite, by treating in aqueous medium of pH lower than 9, an active alumina powder obtained by quick dehydration of hydrargillite in a hot gas stream.

As binding agent for alumina, aqueous suspensions or dispersions obtained from pseudo-boehmite, amorphous alumina gels, aluminum hydroxide gels or ultra-fine hydrargillite, can be used. The pseudo-boehmite may particularly be prepared according to the process disclosed in the U.S. Pat. No. 3,360,670 by reacting an alkaline aluminate solution with a solution of inorganic acid. It may also be prepared, as disclosed in the French Pat. No. 1 357 830, by precipitation, at pH 9, at a temperature slightly higher than room temperature, from reactants at such concentrations that about 50 g/l of alumina are obtained in the dispersion.

Amorphous alumina gels may particularly be prepared according to the processes disclosed in "Alcoa paper" No. 19 (1972)—pages 9–12 and particularly by reacting aluminate with acid or an aluminum salt with a base or an aluminate with an aluminum salt or by hydrolysis of aluminum basic salts, or of aluminium alcoholate obtained by reacting aluminum with alcohol.

The aluminum hydroxide gels may particularly be those prepared according to the U.S. Pat. Nos. 3,268,295 and 3,245,919.

Ultra-fine hydrargillite may particularly be prepared according to the process disclosed in the French Pat. No. 1 373 808, by subjecting alumina gels, as cake containing 0.10 monovalent acid ions per $Al_2O_3$ molecule of alumina to a temperature from room temperature to 60° C.

According to an alternative embodiment of the process of the invention, the alumina binding agent may at least be partially replaced with a silica suspension or dispersion having the same characteristics as the alumina binding agent.

According to the invention, the alumina charge consists essentially of a non dispersable alumina portion optionally with a minor portion of dispersable alumina, which is dispersed in the composition, the non dispersable portion amounting to at least 90% by weight of the charge. It may be preferable that the granulometry of the non dispersed portion of the composition, which is essentially formed of the charge, be such that the average diameter of the alumina particles of which it is formed, be 1–15 microns.

The alumina charge may be any alumina compound having the abovestated characteristics, particularly the alumina hydrated compounds such as: hydragillite, bayerite, boehmite, pseudoboehmite and amorphous or substantially amorphous alumina gels, optionally in the dehydrated or partially dehydrated form of these compounds, which consist of transition aluminas and comprise at least one of the phases selected from the group consisting of rhô, chi, êta, gamma, kappa, thêta, delta and alpha aluminas.

In particular, convenient alumina charges will be those obtained by one of the following processes, optionally after crushing and screening of the particles:

An aqueous solution of the aluminum salt is precipitated with a solution of alkaline aluminate. The obtained precipitate is atomized and then suspended again in an aqueous solution of pH from 4.5 to 7. The resultant alumina mixture is atomized and dried; then the obtained product is washed, dried and calcined (Process disclosed in U.S. Pat. No. 3,520,654).

An alumina gel is precipitated at a pH from 7.5 to 11, then washed, dried, again suspended and the product is quickly dehydrated in a hot gas stream at an inlet temperature of 350°–1000° C. and then calcined (Process disclosed in French Pat. No. 2 221 405).

An alumina gel is precipitated at a pH from 7 to 10.5, the precipitate is matured at a pH from 10 to 11, the obtained mixture is homogenized and atomized at 250°–550° C. and then calcined (Process disclosed in British Pat. No. 888 772).

An alkaline aluminate is precipitated with an inorganic acid at a temperature from 30° to 75° C. The resultant mixture is matured in a second reactor at 35°–70° C., at a pH close to 7, recycled to the mixing reactor, and the product is filtered, washed, dried by atomization and calcined (Process disclosed in U.S. Pat. No. 3,630,670).

Aluminum hydroxides or oxyhydroxides and more particularly hydrargillite, are quickly dehydrated in a stream of hot gases. This dehydration is performed in any convenient apparatus, by means of a hot gas stream, the inlet temperature of the gases in the apparatus generally varying from 400° to about 1200° C., the contact time of the hydroxide or oxyhydroxide with the hot gases being generally from a fraction of second to 4–5 seconds. Such a process of manufacturing active alumina powder has been disclosed particularly in the French Pat. No. 1 108 011.

An active alumina powder obtained by quick dehydration of hydrargillite in a stream of hot gases, drying by atomization and then calcination, has been treated in an aqueous medium of pH lower than 9 (Process disclosed in the European patent application No. 15 196).

The alumina charges obtained according to the various processes may be classified in two groups. The first group concerns charges obtained after drying and optionally calcination, which have a certain dispersion rate.

These products can be used as such for the charge, optionally after crushing and screening. The second group concerns charges obtained after drying, which have a dispersion rate lower than that of the charges of the first group. These charges need, before use, to be calcined at a temperature higher than 300° C., optionally after crushing and screening.

In the process of the invention, the binding agent and/or the alumina charge may be at least partially replaced with an oxide selected from the group consisting of at least one of the metals, above called promoters, or additional metals.

According to the prior art, the charge and the binding agent may be admixed as powders. The powdered binding agent may consist of various products: boehmite, pseudo-boehmite, bayerite, amorphous alumina gels, aluminum hydroxide gels, ultra-fine hydrargillite in non peptized state. The powder mixture is then contacted with water or acidulated water. The charge-binding agent-water mixture is so achieved that the pH of the final composition is lower than 4, in such proportions that the dispersion rate of the final composition is from 10 to 60%.

According to another method, the powdered charge and the binding agent, as alumina suspension or dispersion, can be admixed, under stirring, in such proportions that the dispersion rate of the composition is from 10 to 60% and the pH of the final composition lower than 4.

The present invention hence concerns the use of a catalyst whose manufacture is essentially characterized in that at least a portion of the active phase, or the precursor thereof, is introduced during the shaping of the carrier, i.e. during the admixture of the binding agent with the charge. The active phase generally comprises at least one metal from group VIII, generally present in the catalyst as metal, particularly when the catalyst is a noble metal of the platinum group, and optionally at least one other metal, generally as an oxide or sulfide, to promote the activity of the first metal. At least a portion of the active phase, as explained more in detail hereinafter, will be introduced either in the binding agent of the carrier or in the charge of the carrier or both in the charge and in the binding agent. When the whole active phase is not introduced during the manufacture of the carrier, the complement of active phase will be introduced later on the carrier, according to the conventional methods.

More precisely, at least said portion of the active phase, or its precursor, is introduced (α) either in the charge, (β) or in the binding agent, (γ) or both in the charge and the binding agent.

Said portion of the active phase may be added, substantially in totality, into the binding agent and the charge subsequently (technique I, below).

Said portion of the active phase may be added, substantially in totality, into the charge and the binding agent subsequently (technique II below).

Said portion of the active phase may be added into the binding agent and/or into the charge, during the step of admixing the charge with the binding agent (technique III below).

TECHNIQUE I

When adding the active phase, in major part, into the binding agent, before admixing the binding agent with the charge, the process may be conducted as follows:

(1) Either by impregnation of the binding agent in a conventional way (dry or wet), by means of an acid aqueous solution of a salt or compound of the metal or of at least one metal of the active phase.

For example, a method consists of impregnating the carrier by means of a solution of the metal compounds to be introduced. Either a common solution of these metals or a separate solution for each metal or metals group is used. When several solutions are used, intermediary dryings and/or calcinations may be useful. Usually, a final calcination is performed, for example at 400°–1000° C., preferably in the presence of free oxygen, for example by air scavenging.

Examples of metal compounds other than those of the noble metals from group VIII (platinum family) are, for example, the nitrates, chlorides, bromides, fluorides, sulfates or acetates of these metals or still any other salt or oxide of these metals soluble in water or hydrochloric acid (e.g. chloroplatinate). Also organic complexes containing these metals are convenient.

The noble metals from group VIII and particularly platinum may be used in any other known form, for example, for platinum, hexachloroplatinic acid, ammonium chloroplatinate, platinum sulfide, sulfate or chloride. Ruthenium, for example, may be used in any known form, for example as chloride, bromide, sulfate or sulfide or still, for example, as acetylacetonate, etc . . . .

The halogen, when present in the catalyst, may originate from one of the above-mentioned halides or may be introduced as hydrochloric or hydrofluoric acid, ammonium chloride, ammonium fluoride, chlorine gas or hydrocarbon halide, e.g $CCl_4$, $CHCl_3$ or $CH_3Cl$.

A first method of manufacture consists, for example of impregnating the carrier by means of an aqueous solution of nitrate or other compound of a metal other than those from group VIII, drying at about 90°–150° C. and roasting in air for a few hours at 400°–1200° C., then effecting a second impregnation by means of a solution containing at least one group VIII metal, (for example a solution of hexachloroplaninic acid, when using platinum).

Another method consists of impregnating the carrier by means of a solution containing together:

($\alpha$) the one or more metals from group VIII family (e.g hexachloroplatinic acid), ($\beta$) the one or more metals other than those from group VIII (e.g a chloride, bromide, fluoride, sulfate or acetate of the selected metal or still any other salt of the selected metal soluble in water or in hydrochloric acid or in any other suitable solvent (e.g chloroplatinate, acetylacetonate) and ($\gamma$) optionally chlorine or fluorine.

Still another method consists of introducing the metal elements in as many successive impregnations as metal elements to introduce in the catalyst; for example successively:

a metal from group VIII, by means of a solution containing the same, the impregnation being followed optionally with a drying and a roasting, one or more other metals from group VIII (when the catalyst comprises several metals) by means of a solution containing the same, and finally the one or more other additional metals, said last impregnation being followed with a drying and roasting at, e.g about 400°–1200° C.

Of course, the order of the above mentioned impregnation is not compulsory and may be different.

(2) or by co-gelation of the alumina powder forming the binding agent with the active phase introduced as colloidal suspension, (3) or during the manufacture of the binding agent by co-precipitation of an alumina salt with a salt of the active phase. The binding agent is advantageously dried at a temperature lower than 300° C.

At the end of these techniques for introducing the active phase, the binding agent and the charge are admixed.

TECHNIQUE II

When adding the active phase, in major part into the charge (before admixing the charge with the binding agent), the operation is conducted as precedingly by impregnation, co-gelation or co-precipitation. However, the charge must be further subjected to a calcination at about 300°–1000° C. At the end of these techniques, the binding agent and the charge are admixed.

TECHNIQUE III

The addition of the active phase during the admixture of the charge with the binding agent, preferably with introduction of the active phase in the binding agent or in the charge, may be effected:

(a) in several steps, or (b) in a single step.

(a) in several steps

When it is desired to introduce the active phase preferentially in the binding agent, the method consists of first introducing the binding agent in aqueous solution, then a salt of the active phase and then the charge, previously saturated with a suitable salt, so that the salt of the active phase does not penetrate into the charge (the salt thus permitting to inhibit the charge may be, for example, a volatile salt such as nitrate, chloride, sulfate, ammonium salt, amine, hydroxylamine, hydroxylamine chloride, ammonium acetate, etc . . . ).

When it is desired to introduce the active phase preferentially into the charge, the method consists of introducing the charge, then the one or more salts of the active phase, and then the binding agent inhibited by a salt as above described.

(b) in a single step:

In order to preferentially introduce the active phase in the binding agent or in the charge, either the charge or the binding agent is inhibited as above indicated, by means of a convenient salt, the active phase being thus fixed either in the binding agent, when the charge is inhibited, or in the charge, when the binding agent is inhibited.

For introducing preferentially the active phase in the binding agent, the latter may have a specific surface of about 150–600 m2/g and the charge any specific surface but so selected that the ratio of the respective specific surface of the binding agent and the charge be higher than about 1.5. Thus the salt of the active phase is preferably fixed on the binding agent.

Conversely, for introducing preferentially the active phase into the charge, the latter may have a specific surface of about 100–600 m2/g, the binding agent having such a specific surface that the ratio of the respective specific surfaces of the charge and of the binding agent be higher than about 1.5.

When the active phase comprises several metals, it is possible to introduce separately each metal in the binding agent or in the charge by any one of the above described methods.

When using any one of the three above-defined techniques (technique I or technique II or technique III), the methods for admixing and shaping the binding agent and the charge are preferably selected from:

(a) the extrusion method, (b) the so-called method of the bowl granulator (or revolving bowl or revolving granulator, etc . . . ), and (c) the so-called oil-drop method (drop falling in oil).

Then, after the shaping of the carrier according to one of the 3 above-mentioned methods, the yet non introduced portion of active phase, if any, can be added to the catalyst mass.

Generally, it has been observed that the introduction into the charge of the active phase, or of a part thereof, imparted improved catalytic properties (selectivity, yield) to the final catalyst and it has been observed that the introduction of the active phase or a portion thereof, into the binding agent, imparted to the final catalyst a higher mechanical strength than usually (particularly desirable for use as moving bed), hence of a longer life time.

These catalysts are useful in the above-listed reactions of hydrocarbons conversion and particularly:

for the reactions of methanation by means of catalysts of the nickel and/or molybdenum type, optionally containing at least one metal from the rare-earth family, for the hydrotreatment reactions (hydrosulfurization, hydrodemetallization, etc . . . ), for the so-called post-combustion reactions, for the reactions of catalytic reforming or still for the reactions of hydrocarbons aromatization, for the reactions of hydrocarbons hydrogenation.

Thus, according to the invention, the catalyst carrier of alumina base to which an active phase, consisting for example of at least one metal from group VIII of the periodic classification of elements (e.g cobalt, iron, nickel or a noble metal of the platinum family), must be added, is prepared for example and preferably, either by an extrusion method or by the so-called method of bowl granulator, of revolving granulator (or an equivalent method such as that of the revolving bowl, etc . . . ) or still by the so-called oil-drop method, the method of manufacture being characterized in that at least a portion of the active phase is added either into the charge or in the binding agent or both in the charge and in the binding agent. Generally, the active phase contains at least one metal from group VIII and at least one metal promoter; then, three preferred methods may be considered for shaping the binding agent and/or the charge and said active phase part, during the manufacture of the carrier, depending on whether said active phase part is the group VIII metal and/or the metal promoter.

Hereinafter, the terms "major part of the oxide" of the promoter (or of the promoter oxides, when several promoters are used) or "major part of the group VIII metal" (or group VIII metals when several metals are present in the catalyst) will be used. By "major part", it is meant at least 55% by weight of the total amount of oxide (or oxides, when several oxides are involved), or 55% by weight of the totality of the group VIII metal, expressed as metal (or group VIII metals when several metals are involved), present in the final catalyst, i.e. in the catalyst ready for use.

It is recalled that if all the metal oxide(s) promoters and/or if all the metal or metals from group VIII have not been introduced by the indicated method, this means, on the one hand, that this or these oxides promoters, not introduced by the indicated method, are introduced in the charge or subsequently (i.e. after the manufacture of the carrier) by any suitable method, and, on the other hand, that this or these metals from group VIII, not introduced by the indicated method, are introduced in the charge or subsequently (i.e. after the manufacture of the carrier) by any suitable method.

Various methods can be used for shaping the carrier, i.e. for admixing the binding agent with the charge, a portion of the active phase being already contained in the binding agent or in the charge (technique I or technique II), or the active phase portion being simultaneously added, preferentially into the binding agent or into the charge, during the admixing step (technique III):

I

A first method of shaping the charge-binding agent mixture is that of the oil drop. The metal from group VIII may be introduced into the charge or into the binding agent. But it is also possible to add it at a later stage (i.e. during the manufacture of the carrier, admixed with a portion of the active phase, in conformity with the invention) by any adequate conventional method, for example by impregnation. The so-called promoter or additional metal, generally introduced as one of its oxides, is added either to the binding agent or to the charge, or both to the binding agent and to the charge, or also, but generally in minor part, at the end of the carrier-active phase admixture, by any adequate method, for example by impregnation.

In a preferred manner, six operating methods (1 to 6) are considered:

METHOD 1

The major part of the metal oxide or oxides promoters is introduced into the binding agent and at least a portion, for example the major part, of the one or more metals from group VIII, is introduced into the binding agent. This method is applicable for adding the active phase to the binding agent according to technique III (where the active phase is added to the binding agent during the binding agent-charge admixture) or according to technique I (where the active phase is added to the binding agent before the binding agent-charge admixture).

METHOD 2

The major part of the metal oxide or oxides promoters is introduced into the charge and at least a portion, for example the major part, of the one or more metals from group VIII is introduced into the binding agent. It must be observed that the one or more metal oxide promoters, eventually not introduced as above indicated, are introduced into the binding agent or after the manufacture of the carrier, and the one or more group VIII metals eventually not introduced as above indicated, are introduced into the charge or after the catalyst manufacture. This type of observation relating to method 1 and method 2 is also valid for other methods 3 to 6 and, accordingly, it will not be repeated in the following description, since it is well understood that, when a minor portion of the one or more oxides promoters or of the one or more metals from group VIII is not introduced in conformity with the indicated method, this or these minor portions are then introduced by any other way. This method is applicable in the 3 techniques:

Technique I (addition of a portion of the active phase into the binding agent, the charge being added subsequently), Technique II (addition of a portion of the active phase into the charge, the binding agent being added subsequently), Technique III (addition of the active phase into the charge or into the binding agent during the binding agent-charge admixture).

METHOD 3

The major part of the metal oxide or oxides promoters is introduced into the binding agent and at least a part, for example the major part, of the one or more metals from group VIII is introduced into the charge. This method is also applicable in the 3 techniques:

Technique I (addition of a portion of the active phase into the binding agent, the charge being added subsequently), Technique II (addition of a portion of the active phase into the charge, the binding agent being added subsequently), Technique III (addition of the active phase into the charge or into the binding agent during the binding agent-charge admixture).

METHOD 4

The major part of the oxide or oxides promoters is introduced into the charge and at least a part, for example the major part, of the one or more metals from group VIII, is introduced into the charge.

This method is applicable in technique III (where the active phase is added into the charge during its admixture with the binding agent) and in technique I (where the active phase is added to the charge before its admixture with the binding agent).

METHOD 5

The major part of the one or more oxides promoters is introduced into the binding agent and the one or more metals from group VIII are introduced at a later stage, after the manufacture of the carrier, for example by conventional impregnation. This method is applicable in technique I and in technique III.

METHOD 6

The major part of the one or more oxides promoters is introduced into the charge and the one or more metals from group VIII are subsequently introduced after the manufacture of the carrier, for example by conventional impregnation. This method is applicable in technique II and in technique III.

II

The method of shaping the charge-binding agent mixture is that of the revolving bowl granulator type.

Here two methods Nos. 7 and 8 are essentially selected for the introduction of at least said part of the active phase into the carrier:

A first method (No. 7) consists of introducing the major part of the one or more metal oxides (called promoters) into the binding agent according to techniques I or III. A second method (No. 8) consists of introducing at least a part, for example the major part, of the one or more metal oxides promoters into the charge according to the techniques II or III. For these two methods, the totality of the one or more metals from group VIII is preferably introduced subsequently, after the preparation of the carrier, for example by impregnation.

III

The method of shaping the charge-binding agent mixture is that of the extrusion type.

Several methods are possible which are the same six methods 1 to 6 described for the oil drop technique (dropping of the product in oil).

Preferably, the metals will be incorporated, for example by means of any one of the following processes, the four last processes being the most suitable:

Process according to technique I using the oil-drop or the extrusion method and wherein the total additional metal(s) is (are) added into the binding agent, the one or more group VIII metals being introduced either into the binding agent (method 1) or into the charge (method 3).

Process according to technique II, using the oil-drop or the extrusion method, wherein the totality of the one or more additional metals is introduced into the charge, the one or more group VIII metals being introduced either into the charge (method 4) or into the binding agent (method 2).

Process according to technique I, using the oil-drop or the extrusion method, wherein the totality of the one or more additional metals is introduced into the binding agent, the one or more group VIII metals being introduced subsequently on the carrier (method 5).

Process according to technique II, using the oil-drop or the extrusion method, wherein the totality of the one or more additional metals is introduced into the charge, the one or more group VIII metals being added, after shaping of the carrier (method 6).

Process according to technique I, using the revolving bowl granulator method, wherein the one or more additional metals are introduced into the binding agent, the one or more group VIII metals being added, after the carrier shaping (method 7).

Process according to technique II, using the revolving bowl granulator method, wherein the one or more additional metals are introduced into the charge, the group VIII metals being introduced subsequently in the carrier (method 8).

Process according to technique III, using the oil-drop or the extrusion method, wherein the one or more additional metals are introduced into the binding agent, the one or more group VIII metals being introduced into the binding agent (method 1) or into the charge (method 3).

Process according to technique III, using the oil-drop or the extrusion method and wherein the one or more additional metals are introduced into the charge, the one or more group VIII metals being introduced into the binding agent (method 2) or into the charge (method 4).

Process according to technique III, using the oil-drop or the extrusion method and wherein the one or more additional metals are either introduced into the binding agent (method 5) or into the charge (method 6), the one or more group VIII metals being subsequently introduced into the carrier.

Process according to technique III, using the revolving bowl granulator method and wherein the one or more additional metals are introduced into the charge (method 8) or into the binding agent (method 7): the one or more group VIII metals being introduced subsequently into the carrier.

The catalyst prepared according to the present invention can be used in the above-listed reactions, preferably for:

(a) Methanation, particularly with a catalyst of nickel, tungsten or molybdenum base, also preferably containing at least one metal from the rare earth group. It is generally preferred to introduce the one or more metal promoters into the charge. The methanation catalysts are prepared according to any one of the indicated methods.

(b) Reforming and also reactions of aromatic hydrocarbons production with catalysts shaped according to the invention,
 either by "the revolving bowl granulator" method,
 or by the "extrusion" method,
 or by the preferred "oil-drop" method.

(c) Post combustion with catalysts shaped according to the invention:
 either by "the revolving bowl granulator" method,
 or by the "extrusion" method,
 or preferably by "the oil-drop" method.

(d) Hydrotreatment with catalysts shaped in accordance with the invention:
either by the "oil-drop" method,
or preferably by the "revolving bowl granulator" method,
or the "extrusion" method.

(e) The hydrogenation of the unsaturated compounds of a hydrocarbons charge.

Concerning more particularly the oil-drop method, the procedure will be preferably as follows:

According to a first process, the drops of binding agent and charge are introduced into a liquid non miscible with water, in such a manner that the drops form substantially spherical particles. These particles are simultaneously coagulated and/or subsequently put in spheroidal shape by a gelling agent which removes the stabilizing ligands. Also simultaneously, at least a portion of the active phase of the catalyst is added, either in the binding agent or in the charge or both in the charge and in the binding agent.

The liquid non miscible with water may be such that the drops fall (density of the liquid lower than the density of the drops) or rise (density of the liquid higher than the density of the drops) in the treatment liquid; examples of liquids non miscible with water, suitable for the process of the invention, are particularly crude oil, kerosene, dodecylbenzene, trichloroethylene, perchloroethylene, organic solvents, hydrocarbons and inorganic oils generally.

The gelling agent which removes the stabilizing ligands may particularly be ammonia, an ammonia solution, ammonium carbonate, long-chain amines (particularly those sold under trade mark "Primene"), hexamethylene tetramine, urea.

The resultant drops are recovered from the medium used for their shaping and/or coagulation.

According to a preferred embodiment, the drops of the mixture are introduced into a column containing an upper phase consisting of crude oil and a lower aqueous phase consisting of an ammonia solution. The shaping takes place in the upper phase and the gelation essentially in the lower phase. The temperature of the crude oil is generally close to room temperature. The pH of the ammonia solution must be maintained above 9. The residence time of the drops in the ammonia solution is a few minutes and generally less than about 15 minutes. In these conditions, the recovered balls are sufficiently hard and are not deformed by subsequent handlings. Two new advantages of the process of the invention appear particularly for said step of spheroidal shaping and gelation: the shaping is performed at room temperature and the gelation is performed very quickly, thus it is not absolutely necessary to proceed to a subsequent ageing of the balls in a basic solution, the latter having a sufficient strength, after a short residence time in the ammonia phase.

According to a second process, the drops of the mixture are introduced (suspended) into a non miscible liquid, liable to remove water from the drops. This non miscible liquid extracts water from the drops and causes their gelation in spheroidal shape. For example, 2-ethyl-1-hexanol or a long-chain aliphatic alcohol, sold under trade mark Octylol, can be used.

According to a third process, the mixture is admixed with at least one hydrosoluble monomer whose non cross-linked polymer is soluble in water or forms a gel. The resultant mixture is then dispersed, as drops, in a hot fluid medium where a substantial polymerization of the monomer occurs. The monomer may be an acrylic compound of general formula:

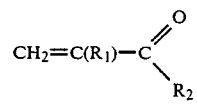

wherein $R_1$ is H or a methyl radical, $R_2$ is $OR_3$ or $NR_3R_4$, in which $R_3$ and $R_4$ represent H or a hydrophylic radical, particularly a hydroalkyl radical containing 1 or 2 carbon atoms, or a methoxymethyl radical. The main steps of the process have been described, in particular, in the French Pat. Nos. 2 261 056 and 2 261 057.

Independently from the use of a particular process, the obtained balls are then separated from their gelation medium and then dried and calcined at a temperature of about 550°–1100° C.

The resultant balls have a total pore volume of 0.30–1.7 cc/g their micro pore volume (consisting of pores of a diameter lower than 0.06 micron), being 0.5–1 cc/g, their macropore volume (consisting of pores of a diameter larger than 0.06 micron) being 0.05–0.7 cc/g, the average diameter of the macropores being 0.1–10 micron. The specific surface of said balls is about 80–350 m2/g (BET method, products dried at 110° C.), their breaking strength being higher than 1 kg.

With respect more particularly to the extrusion method or the revolving granulator method, the manufacture of the catalyst is conducted more particularly as follows:

(1) during an optional first step, the material used as carrier is washed.

(2) during a second step, the material used as carrier is dried by any adequate method, for example by stove-drying, so as to obtain a powder which keeps the same structure as the starting material and which, after drying, is characterized by a loss on heating of about 15–40% at 1000° C.

(3) during an optional third step, the material is washed and dried.

(4) at this stage, before the subsequent steps, it is often preferable to roast at least partially the dried powder. Thus, 20–80% of the alumina powder can be subjected to a temperature of about 200°–800° C. and the roasted powder can be admixed with the non roasted powder. Here the advantage is to impart to the products to be obtained, a macro-porosity by means of two-phase products. More precisely, it is desired to obtain here, after admixture of the roasted powder with non-roasted powder, a powder of particle diameter ranging from 1 to 50 microns and having a critical macro-porosity corresponding to pores of a diameter larger than about 600 Å.

(5) then, the resultant powder is shaped:
(a) either by extrusion, (b) or by means of a revolving bowl-granulator or by any equivalent means, this shaping being characterized by the simultaneous addition of at least a portion of active phase into the binding agent (dispersed alumina) or into the charge (non dispersed alumina).

When proceeding by extrusion, the operation is as follows:

For a period from 5 minutes to 5 hours, the powder is mixed in the presence of water or acidulated water, the water or acidulated water containing at least a portion of the catalyst active phase (i.e metal oxides and/or precious metals).

The amount of water or of acidulated water is, by weight, 50–89% of the powder weight.

The resultant paste is extruded by any adequate method, for example with a single-screw or double-screw extruding machine or any other machine, through a drawing plate.

The resultant extrudates are dried at a temperature generally lower than 350° C. so that the loss on heating of the resultant solids be about 15–40%.

At this stage, the portion of active phase not yet admixed to the carrier is optionally and conventionally introduced and the operation terminates with a drying, for example at a temperature lower than 350° C.

Then optionally, the extrudates are subjected to a hydrothermal treatment in neutral, acid or basic medium at a temperature of 80°–500° C., so that the amorphous structures develop into boehmite or pseudo-boehmite structures and lead to improved mechanical properties.

The obtained extrudates are roasted at a temperature generally from 350° to 1000° C.

The sequential order to these two latter steps may be reversed.

When operating according to the revolving granulator method or similar (bowl granulator or other: revolving plate, rotary bowl, etc . . . ), the operation is conducted as follows: on the one hand, the powder is caused to run on the granulator and, on the other hand, an aqueous solution or an acidulated aqueous solution is simultaneously introduced by pouring or by pulverization, on the granulator. This solution contains at least a part of the active phase of the catalyst (i.e metal oxides and/or precious metals). Generally, the bowl granulator or the granulator is wet while the powder rotates. The powder agglomerates by sticking of the present powder particles. The particles are removed according to usual methods, for example by ejection from the bowl granulator, obtained by centrifugation and then they are dried and roasted as above-explained for the so-called extrusion method (with optional introduction, as above explained, of the portion of active phase not yet introduced on the carrier).

An improvement in the method would consist of feeding the granulator with a portion of powder (about 0–40% thereof) already diluted with the aqueous solution or preferably with the acidulated aqueous solution. (It is so possible to dilute a portion of the powder in the acid which is used to form said acidulated aqueous solution).

The catalysts prepared according to the invention are useful, in particular, in the reactions of hydrocarbons and carbon monoxide hydrogenation.

The catalysts according to the invention are thus particularly useful in the processes for the selective hydrogenation of acetylenic hydrocarbons contained in a mixture of hydrocarbons containing diolefinic hydrocarbons.

The processes for hydrocarbon conversion at high temperature, such for example as steam-cracking, produce unsaturated hydrocarbons, for example ethylene, propylene, butadiene, butenes, as well as hydrocarbons boiling within the gasoline range. The gaseous olefinic and diolefinic hydrocarbons of 2–4 carbon atoms, obtained by this process also contain a certain amount of acetylenic hydrocarbons. The acetylenic hydrocarbons content varies in relation with the severity of the conversion treatment but is always too low for considering their separation and use, as such, in the petrochemical industry, as of interest. However, their presence together with olefinic and diolefinic hydrocarbons makes it difficult or even impossible to use the latter in the petrochemical industry. This is true for example for benzene from which vinyl acetylene and butynes have to be removed, as much as possible, in order to make it suitable for elastomer production.

In order to remove these acetylenic hydrocarbons, various separation processes have been proposed in the prior art, such for example as extractive distillation, used to separate hydrocarbons of different unsaturation degrees or still selective hydrogenation of acetylenic compounds contained in the charge, for example a raw steam-cracking $C_4$ cut, in the presence of a catalyst with an alumina carrier containing a noble metal (e.g palladium) or another metal promoter, generally from group VI of the periodic classification, the operating conditiosn being generally as follows:

total pressure: 1–50 bars, preferably 3–10 bars,
space velocity liquid charge volume/catalyst volume/hour
temperature 0°–100° C., preferably 10°–50° C.,
ratio $H_2$/acetylenic compounds in mole/mole: 1–5 and preferably 1.1–2.

Generally, in the prior art, a catalyst with an alumina base containing a group VIII metal and a metal promoter, is prepared from a carrier consisting of a transition alumina, for example shaped as balls, extrudates, crushed materials, pellets, etc . . . of a specific surface from 120 to 500 m2/g and a total pore volume of 0.2–0.9 cc/g. This alumina is then impregnated by means of a solution of a soluble salt, for example of nickel or cobalt, generally selected from nitrates, chlorides, formiates, etc . . . so as to obtain in the so-impregnated carrier from 1 to 10% by weight of nickel or cobalt, calculated as oxide. The resultant solid is then dried and roasted in the presence of air, for example in air atmosphere or under an air stream, at a temperature advantageously from 700 to 850° C., for example for 1–6 hours. After cooling, a compound, for example a salt of metal from group VI A, such, for example as an ammonium molybdate or tungstate is incorporated, in any convenient way, for example by impregnation, mixing or coprecipitation. The total proportion by weight of the deposited metal oxides (NiO or CoO, $MoO_3$ or $WO_3$) is preferably 5–30%. The relative proportions of oxides or sulfides of metals from groups VI and VIII may be for example as follows: for oxides of metals from group VIII, 10–50% by weight, for oxides of metals from group VI A, 50–90% by weight. The resultant catalyst is then dried and roasted at a temperature of, for example, 400–600° C.

In order to be used for hydrogenation, the catalyst may be advantageously subjected to presulfurization, generally conducted "in situ". This pretreatment may be performed with a gas stream containing, in addition to hydrogen and/or an inert gas, such as for example nitrogen or methane, from 1 to 10% by volume of hydrogen sulfide, at a temperature of 200–500° C., for a sufficient time to convert at least the major part of the oxides of metals from group VIII and from group VI A to corresponding sulfides, i.e. for example NiO and CoO to $NI_3S_2$ and $Co_9S_8$ and $MoO_3$ and $WO_3$ to $MoS_2$ and $WS_2$.

The final catalyst will have a specific surface generally lower than that of the starting alumina.

The specific surface of the final catalyst is preferably from 120 to 300 m²/g. The operating conditions of the hydrogenation are so selected as to hydrogenate substantially completely the diolefinic and styrenic hydrocarbons, while avoiding polymerization and gum deposit formed from said products. The total pressure is usually 20-60 kg/cm², the temperature 50°-250° C., the VVH (space velocity=hourly liquid flow rate by volume per catalyst volume unit) of 0.5-5, preferably 1-2.5 and the hydrogen flow rate of 0.2-2 moles per mole of liquid charge. The operation is conducted with several catalyst fixed beds. The operating conditions are such that the major part of the charge is maintained in liquid phase, which results in a better washing of the gums optionally present in the gasoline or optionally formed in the reactor.

The catalysts prepared according to the invention are particularly suitable also in quick and highly exothermic catalytic reactions between two or more gaseous compounds, with production of gas of high methane content. A typical example of such a reaction is that leading to the formation of methane (methanation) from a mixture of CO and $H_2$, in accordance with the total stoichiometry:

$$CO + 3H_2 \rightleftharpoons CH_4 + H_2O$$

or by the reaction leading to the formation of alcohols, particularly methanol, according to the total stoichiometry:

$$CO + 2H_2 \rightleftharpoons CH_3OH$$

or still the synthesis of hydrocarbons heavier than methane.

These reactions are strongly exothermic (the adiabatic temperature rise for the methane synthesis is about 17° C. per 1% conversion).

It is known since a long time that methane is produced with a good selectivity by contacting carbon monoxide with hydrogen in the presence of a catalyst of nickel base. This reaction has been used, up to now, more particularly for removing small amounts of carbon monoxide of about 1% remaining in hydrogen, after the synthesis thereof by steam-reforming or partial oxidation of a hydrocarbon fraction.

However, in view of the possible shortage of energy resources, the manufacture of methane, as substitute for natural gas, offers a renewed interest and the treatment of hydrogen at CO concentrations from 10 to 40% or more may be considered.

Hence, the main difficulty to overcome in the reaction of carbon monoxide with hydrogen is the removal of the heat evolved during this highly exothermic conversion.

The conventional use of heterogeneous catalysts in fixed bed was not favorable to a good heat exchange, in view of the liability of local overheatings detrimental to the activity and to the life-time of the catalyst.

The methanation process has nevertheless be improved by use of a diluting substance, associated or not with a heat exchange through the reactor wall. Several processes have thus been elaborated using as diluent either the output gas mixture which is partially recycled, with or without steam injection, or a liquid, for example a hydrocarbon which, in the reactor operating conditions, may eliminate the calories by sensible heat and evaporation.

A high recycle rate of the liquid and of the condensed steam ensures the thermal stability of the reactor.

In the processes using a liquid, the catalyst generally consists of suspended fine particles or of particles forming a fixed bed or a boiling bed.

It is important that the catalyst be immersed in the liquid in order to provide a good liquid-solid contact. This avoids the formation of a dry zone in the reactor, which zone could be responsible for a lack of thermal stability, this dry zone being liable to undergo very high temperatures resulting from the development of the reaction entirely in gaseous phase, at said locations. Thus, various techniques have been proposed, using a continuous upward liquid phase circulation, the catalyst being used either as suspension, as boiling bed or as fixed or moving bed. These techniques suffer however from serious disadvantages: in particular, the problem of catalyst attrition, resulting from the displacement of the catalyst particles, is not negligible, even in fixed bed, the fine catalyst particles being liable to be driven away from the reaction zone, resulting in excessive developments of the reaction in the separators, exchangers or in other locations of the plant. Finally, the productivity of the catalyst bed is relatively reduced. Now the method of manufacturing catalysts according to the invention at least partially meets with these difficulties.

The diluent is a liquid which, in the reaction conditions, takes no substantial part to the latter and has no detrimental effect on the catalyst. It is preferably a hydrocarbon or a hydrocarbon fraction (oil cut). It may consist, for example, of a gas oil cut, a fuel cut, a molten paraffin wax, an aromatic oil, a silicon oil or a liquid polymer of tetrafluoroethylene.

These liquids have usually a density of 0.4-2 g/cc and a viscosity of 0.05-10 centipoises (0.05-10 MPa.s) in the reaction conditions, these values being illustrative and not compulsory. Although the stoichiometry ratio of the reaction is 3 $H_2$ moles per CO mole (methane synthesis) or 2 $H_2$ moles per CO mole (methanol synthesis), different ratios may be used. Particularly, when the hydrogen amount is insufficient, the formed water may react with the carbon monoxide excess by producing hydrogen, according to the well known reaction $$CO + H_2O \rightleftharpoons CO_2 + H_2.$$

Accordingly hydrogen can be used in a proportion of 1.5-4 moles per mole of carbon monoxide.

The temperature and pressure are selected within usual ranges, in accordance with the catalyst and the selected reaction. The temperatures are mostly 200°-400° C. and the pressures 1-40 MPa. The catalyst for this reaction has an alumina carrier and, as hydrogenolysing agent, one or more metals from group VIII of the periodic classification of elements, particularly elements selected from the group consisting of iron, cobalt and nickel.

The one or more group VIII metals are deposited on a suitable carrier and one or more metal elements (or one of their derivatives), selected preferably from chromium, molybdenum, tungsten, titanium, zirconium, hafnium and metals from the rare-earth family, are added thereto.

The catalysts simultaneously containing, on the one hand, at least one metal from group VIII and, on the other hand, at least one of said additional elements selected from chromium, molybdenum, tungsten, titanium, zirconium, hafnium, and rare-earth metals, have the advantage of a considerable selectivity increase in the hydrogenolysis reaction, said selectivity resulting in the production of very pure methane and also in the advantage of a life-time increase. As a result the catalyst regeneration, at the end of the cycle, is more easy and leads to a regenerated catalyst which keeps the better its initial activity and selectivity, as it is prepared in conformity with the present invention.

Preferably, the group VIII metals of the catalyst are not noble metals of this group (metals of the platinum family) since the hydrogenolyzing power of noble metals is not so "deep" and results in a lower methane yield than that obtained with at least one of the metals from the group consisting of iron, nickel and cobalt, preferably nickel. However, small amounts of noble metals from the platinum group might be used as second additional element.

The iron and/or cobalt and/or nickel content (expressed as metal element) is preferably 0.5–50% by weight with respect to the total catalyst weight ready for use. The content of additional metal (expressed as metal element) selected from chromium, molybdenum, tungsten, titanium, zirconium, metals of the rare-earth family and hafnium, is generally from 0.01 to 20% by weight, preferably 0.1–10% by weight and more particularly 0.3–0.8%. When nickel is used, the preferred nickel content is 15–25% by weight.

In addition, as second additional metal, the catalyst may contain small amounts of noble metals of the platinum family, for example 0.01–5% by weight of platinum, palladium, iridium, or rhodium etc., preferably 0.01–1% by weight (expressed as metal element).

EXAMPLES

The invention will be further illustrated by the following non limitative examples.

EXAMPLE 1

Several alumina catalysts containing nickel and molybdenum are prepared in view of being tested for their performances in hydrogenation reactions.

Seven catalysts (containing 20% by weight of nickel oxide and 10% by weight of molybdenum oxide) are prepared according to the following methods:

Catalyst A (not conforming with the invention)

To a transition alumina carrier having a specific surface (BET) of 250 m$^2$/g and a total pore volume of 0.6 cc/g are incorporated 20% by weight of nickel oxide by impregnation with an aqueous solution of nickel nitrate. The catalyst is then dried and roasted at 500° C. for 2 hours. Then, 10% by weight of molybdenum oxide are incorporated therein by impregnation with an ammonium paramolybdate solution. The catalyst is then dried and roasted at 500° C. It is then treated with a stream of H$_2$S diluted at 2% concentration by volume in hydrogen, at a temperature of 300° C. for 5 hours. The specific surface of the catalyst is 200 m$^2$/g.

Catalyst B (not conforming with the invention)

An ultra-fine boehmite sol is prepared as follows: A cake of alumina gel is prepared by continuous precipitation of a sodium aluminate solution whose Al$_2$O$_3$/Na$_2$O ratio by weight is about 1.08, at a concentration of 100 g/l, expressed as Al$_2$O$_3$, with a nitric acid solution at such a concentration that the suspension contains about 50 g/l of alumina, expressed as Al$_2$O$_3$ and the NO$_3$/Al$_2$O$_3$ molecular ratio is 0.16. The precipitation pH is then about 9. The so-prepared gel cake is dried, filtered and washed. It is then treated for 24 hours at 115° C. in a shaked autoclave. The resultant product is a paste containing 12% of alumina, expressed as Al$_2$O$_3$.

The specific surface, measured by the BET method, of said product, dried in a stove at 110° C., is about 300 m$^2$/g. The geometrical surface of this product measured after drying by dispersion in isopropanol, azeotropic distillation and then evaporation of isopropanol, is about 550 m$^2$/g. The photograph of this product, obtained with an electronic microscope, shows that it consists of ultra-fine boehmite, entirely fibrillar, composed of monocrystals shaped as elongate and very narrow lathes, often forming bundles, the microcrystals having a longitudinal size of about 500–1000 Å. Along the two other directions, when considering the microcrystals are cylinders, it can be deduced from the specific surface, measured by the BET method, that these microcrystals have an average diameter of 55 Å. The Debye-Scherrer diagram of this product shows the absence of reflections (hkl), a halo (012) and a clear reflection (200).

The resultant sol, which constitutes the binding agent, is contacted with an amount of acidulated water so selected that the pH of the final composition be lower than 4 and that the dispersion rate of the composition be 30%. The binding agent is admixed with an alumina charge, as powder. The amounts of binding agent and charge are so selected that the resultant carrier contains, by weight, 30% by binding agent and 70% of charge. The charge-binding agent mixture is effected as follows:

Drops of the mixture of dispersed alumina (binding agent) and non dispersed alumina (charge) are formed by means of calibrated tubes of about 2.5 mm internal diameter. The drops fall into a column of 600 mm diameter containing an oil layer of about 6 cm, floating above an ammonia solution at about 20 g/l concentration. The residence time of the particles in the ammonia solution is about 2 minutes. The drops become round in the oil and gel in the ammonia solution. The recovered balls are very hard and undergo without deformation the transfer operations. They are then dried and calcined at 950° C. for one hour. Their diameter is about 3.5 to 4 mm.

On the carrier so-prepared by the oil-drop technique, nickel and molybdenum are added according to the techniques, indicated for catalyst A, so as to obtain the same metals contents as in catalyst A.

Catalyst C (conforming with the invention)

The manufacture of catalyst B is repeated, but the ammonium paramolybdate solution is added at the beginning and then during the oil-drop method operation, this solution being introduced into the binding agent (dispersed boehmite). Nickel is introduced subsequently, as for catalyst B.

Catalyst D (not conforming with the invention)

A sol of ultra-fine boehmite is prepared according to the technique used for catalyst B. The mixture of binding agent (dispersed boehmite) and charge (non dispersed boehmite) is extruded from its paste formed with water and nitric acid: Thus, a homogeneous paste is prepared after admixture, for 3 hours, of 500 g of alumina with a solution containing 250 cc of distilled water and 20 cc of 0.001M nitric acid.

The paste is extruded through a drawing plate of 1.5 mm, on an extruder of the piston type.

The extrudates are dried at 300° C., so that the loss on heating of the obtained solid is about 20%.

To the resultant catalyst mass, nickel and molybdenum are added according to the techniques used for manufacturing catalysts A.

Catalyst E (conforming with the invention)

The manufacture of catalyst D is repeated, but the solution of ammonium paramolybdate is added into the binding agent (dispersed boehmite) during the extrusion.

Nickel is added subsequently, as for catalyst D.

Catalyst F (not conforming with the invention)

An ultra-fine boehmite sol is prepared according to the technique used for the preparation of the catalysts B. The mixture of binding agent (dispersed boehmite) and charge (non dispersed boehmite) is agglomerated by means of a revolving granulator: 500 grams of powder are poured on the granulator and simultaneously an aqueous solution containing 250 cc of distilled water and 20 cc of 0.001M nitric acid is introduced on the granulator.

The granulator or bowl granulator is thus wet as the powder rotates. The powder agglomerates by sticking of the present powder particles.

The particles are removed by ejection from the bowl granulator, by centrifugation and then dried at 300° C. so that the loss on heating of the obtained solids be about 20%.

To the resultant catalyst mass, nickel oxide and molybdenum oxide are added according to the technique used for the preparation of catalysts A.

Catalyst G (conforming with the invention)

The manufacture of catalyst F is repeated except that the ammonium paramolybdate solution is added into the binding agent (dispersed boehmite) during the granulation step.

Nickel is added subsequently, as for catalyst F. Catalysts B to G are presulfurized as catalyst A.

EXAMPLE 2

Several catalysts of alumina base and containing nickel and cerium are prepared in view of being subsequently tested for their performances in methanation reactions.

Seven catalysts H to N, containing 20% by weight of nickel and 0.5% by weight of cerium oxide are prepared as follows:

Catalyst H (not conforming with the invention)

The carrier is a transition alumina having a specific surface (BET) of 250 m²/g and a total pore volume of 0.6 cc/g. At room temperature, 100 g of this carrier are impregnated, with 50 cc of a nickel nitrate solution containing 40% by weight of nickel. The solid and the solution are maintained in contact for 2 hours, and then the impregnated solid is placed in a stove where it is dried in a dry air steam at a temperature of 110° C. for 2 hours.

The dry catalyst is then placed in a furnace and progressively heated to 450° C. (in one hour) in an air stream dried over activated alumina, and it is further maintained for 2 hours at said temperature.

The resultant product is then impregnated with 50 cc of a solution containing 1.56 g of cerum nitrate Ce(NO$_3$)$_3$, 6H$_2$O.

Then the procedure is the same as after the nickel introduction.

The roasted catalyst is then reduced in the reactor, under hydrogen stream, at a temperature of about 300° C., for 2 hours.

The final catalyst contains:
20% by weight nickel and
0.5% by weight cerium.

Catalyst I (not conforming with the invention)

A sol of ultra-fine boehmite prepared according to the technique used for the manufacture of catalyst B is shaped according to the oil-drop technique, as for catalyst B. Nickel and cerium are added to the so-prepared carrier in the manner indicated for catalyst H, so as to obtain the same metal contents as in said catalyst H.

Catalyst J (conforming with the invention)

The manufacture of catalyst I is repeated but with the addition of the cerium nitrate solution at the beginning and then during the oil-drop method operation, said solution being introduced in the charge (non dispersed boehmite). Nickel is introduced subsequently, as for catalyst I.

Catalyst K (not conforming with the invention)

A sol of ultra-fine boehmite is prepared according to the technique used for catalyst B. The mixture of the binding agent (dispersed boehmite) with the charge (non dispersed boehmite) is extruded from its paste formed with water and nitric acid. Thus, a homogeneous paste is prepared after admixture, for 3 hours, of 500 g of alumina with a solution containing 250 cc of distilled water and 20 cc of 0.001M nitric acid.

The paste is extruded through a drawing plate of 1.5 mm, on an extruder of the piston type.

The extrudates are dried at 300° C., and the loss on heating of the obtained solid is about 20%.

Nickel and cerium are then added to the obtained catalyst mass, in accordance with the techniques used for the manufacture of catalyst H.

Catalyst L (conforming with the invention)

The manufacture of catalyst K is repeated, but with the addition of the cerium nitrate solution into the charge (non dispersed boehmite) during the extrusion.

Nickel is added subsequently, as for catalyst K.

Catalyst M (not conforming with the invention)

A sol of ultra-fine boehmite is prepared according to the technique used for the manufacture of catalyst I. The mixture of the binding agent (dispersed boehmite) with the charge (non dispersed boehmite) is agglomerated with acid in a revolving granulator. 500 g of powder are poured on the granulator and, simultaneously, an aqueous solution containing 250 cc of distilled water and 20 cc of 0.001M nitric acid, is introduced on the granulator.

The granulator or bowl granulator is thus wet when powder revolves.

The powder agglomerates by sticking of the present powder particles.

The particles are removed by ejection from the bowl granulator, by centrifugation, and then they are dried at 300° C.; the loss on heating of the obtained solids is about 20%.

Nickel oxide and cerium oxide are added to the resultant catalyst mass, in accordance with the technique used for the manufacture of catalyst H.

Catalyst N (conforming with the invention)

The manufacture of catalyst M is repeated, but the cerium nitrate solution is added during the granulation step, into the charge (non dispersed boehmite).

Nickel is added subsequently, as for catalyst M.

EXAMPLE 3

The catalysts A to G are tested for determining their activity and stability in a hydrogenation reaction. A test of fast ageing is conducted as follows:

The charge to be hydrogenated contains isoprene diluted, in a 10% molar proportion, in benzene. In order to measure the resistance of the catalyst to mercaptans, ethyl-mercaptan is added in a proportion of 1000 ppm, expressed as sulfur weight. The operating conditions are the following:

Temperature: 105° C.
Pressure: 50 bars
VVH (charge volume/catalyst volume/h): 6
$H_2$/charge (reactor inlet): 1 mole/mole The test is continued for about 20 hours. The results are given in Table 1 below:

TABLE 1

| catalysts | % isoprene conversion | | | | |
|---|---|---|---|---|---|
| | after 2 hours | after 5 hours | after 10 hours | after 15 hours | after 20 hours |
| A | 81.7 | 80.8 | 78.9 | 77.8 | 76.5 |
| B | 80.5 | 80.30 | 80.1 | 79.5 | 78.5 |
| C | 82.3 | 82 | 81.7 | 81.5 | 81.1 |
| D | 80.5 | 80.3 | 80 | 79.4 | 78.4 |
| E | 82.3 | 82.1 | 81.7 | 81.6 | 81.2 |
| F | 80.7 | 80.2 | 79.5 | 78.6 | 78.0 |
| G | 82.5 | 82.0 | 80.7 | 80.3 | 79.9 |

It can be observed that the catalysts prepared in a conventional manner (A, B, D and F) are less active and less stable than the catalysts prepared according to the invention (C, E and G) which have a high activity and stability.

EXAMPLE 4

Catalysts H to N are tested in a methanation reaction:

Each catalyst is activated in a reactor by treatment with a 5% $H_2$ and 95% $N_2$ by volume mixture, flowing at a space velocity (VVH) of 500 volumes per volume of catalyst and per hour, for 20 hours, at a temperature progressively increasing from 330° to 430° C.

A synthesis gas and a liquid phase are circulated downwardly through 1.25 $dm^3$ of catalyst, arranged in fixed bed in the reactor. The liquid is evenly distributed through a perforated plate. The effluent is withdrawn. The liquid phase is separated from the gas phase at the reactor outlet, in a separator, and continuously recirculated through a pump and a cooling exchanger. The gas is not recycled; it is withdrawn and analysed. It may be condensed to recover the formed products.

A reactor of 4 cm diameter and 1 m height is used. The synthesis gas consists of a 25% carbon monoxide and 75% hydrogen mixture.

The gas feed rate is 6 $m^3$/h in normal temperature and pressure conditions, corresponding to a surface velocity of 4.2 cm/m at 325° C., which is the temperature of the experiment, and 7 MPa.

The liquid phase is a $C_{10}$-$C_{16}$ cut of desulfurized paraffinic hydrocarbons having a density of 0.85 at 20° C. (about 0.6 at 330° C.). Its viscosity at 330° C. is about 0.12 centipoise (0.12 MPa). Its flow rate, measured at 20° C., is about 140 l/h, i.e. about 200 l/h at 330° C., which corresponds to a surface velocity of 4.5 cm/s and a VVH of 156.

The discharged liquid is recirculated. Periodically or continuously, the formed light products, particularly methane, other light hydrocarbons and water, are separated.

The operating conditions are such as to obtain, with each catalyst, a selectivity to methane of 96% after 2000 hours. The carbon monoxide conversions, after 2000 hours, are given in Table II below:

TABLE II

| Catalyst | Carbon monoxide conversion |
|---|---|
| H | 86.0 |
| I | 86.5 |
| J | 87.7 |
| K | 86.3 |
| L | 87.4 |
| M | 86.2 |
| N | 87.1 |

What is claimed as the invention is:

1. In a process for the production of a catalyst consisting essentially of (a) a carrier consisting essentially of a major part of alumina and, (b) an active phase consisting essentially of at least one metal from group VIII and at least one additional metal or promoter, wherein the carrier is obtained by admixing a binding agent consisting essentially of a major part of alumina base, with a charge, consisting essentially of a major part of alumina base, shaping and drying the resultant mixture, the proportion by weight of the binding agent amounting to 15-40% of the total carrier, the proportion by weight of the charge amounting to 60-85% of the total carrier, the alumina binding agent consisting essentially of dispersed alumina and 0-30% of non-dispersed alumina, the alumina charge consisting essentially of non-dispersed alumina and less than 10% of dispersed alumina, the dispersion rate of the composition resulting from the mixture of the binding agent with the charge being from 10 to 60%, the improvement wherein in said process at least a portion of a source of said additional metal is introduced into the binding agent or into the charge prior to completion of the formation of said carrier, and wherein said group VIII metal is incorporated subsequent to inclusion of the additional metal in the carrier, said improvement further comprising simultaneously mixing (a) the said source of the additional metal
(b) the binding agent and
(c) the charge, the said source of the additional metal penetrating into either the charge or the binding agent, either the charge or the binding agent having previously been saturated with a salt such that the source does not penetrate into the portion of the carrier that has been so saturated.

2. A process according to claim 1, wherein the source of the additional metal is added to the charge before admixture of the charge and the binding agent.

3. A process according to claim 1, wherein the source of the additional metal is added to the binder before admixture of the charge and the binding agent.

4. A process according to claim 1, wherein said process of admixing the binding agent with the charge is selected from the oil-drop method, the extrusion method or the revolving bowl granulator method.

5. A process according to claim 4, using the oil drop or the extrusion method, wherein the said source of the additional metal is introduced into the binding agent during admixture of the charge and the binding agent, and wherein the major part of the group VIII metal is introduced into the carrier subsequent to admixture.

6. A process according to claim 4, using the revolving bowl granulator method, wherein the said source of the additional metal is introduced into the binding agent during admixture of the charge and the binding agent, and wherein the major part of the group VIII metal is introduced into the carrier subsequent to admixture.

7. A process according to claim 1, wherein the binding agent consists essentially of an alumina base selected from the group consisting essentially of fine boehmite, ultra-fine boehmite, or a pseudo-boehmite.

8. In a process for the production of a catalyst comprising (a) a carrier and, (b) an active phase, wherein the carrier comprises a binding agent and a charge, and wherein at least a portion of a source of the active phase is introduced into the carrier during admixing of the charge with the binding agent, so that a major part of said source is incorporated into one of the binding agent or the charge, the improvement wherein prior to admixing one of the charge or the binding agent is saturated with a salt so that the source of the active phase does not penetrate the portion of the carrier that has been so saturated.

9. A process according to claim 8, wherein prior to admixing, the charge is saturated with a salt so that the source of the active phase does not penetrate the binder.

10. A process according to claim 9, wherein prior to admixing, the binder is saturated with a salt so that the source of the active phase does not penetrate the charge.

11. A process according to claim 8, wherein the salt comprises a salt of a nitrate, a chloride, a sulfate, an amine, a hydroxylamine, or an ammonium compound.

12. The catalyst produced according to the process of claim 1.

13. The catalyst produced according to the process of claim 8.

* * * * *